United States Patent Office 3,545,208
Patented Dec. 8, 1970

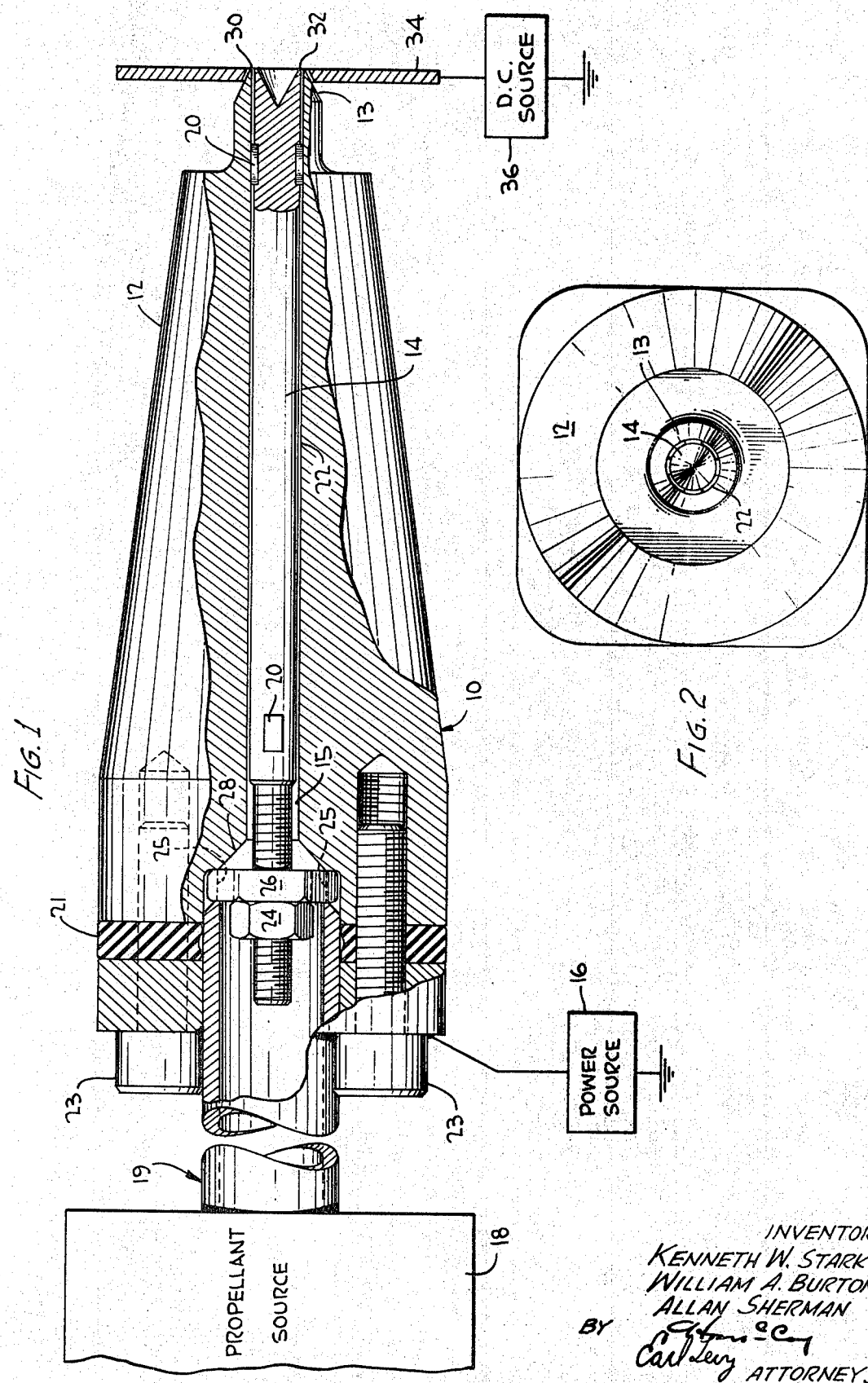

3,545,208
ANNULAR SLIT COLLOID THRUSTOR
Kenneth W. Stark, Hyattsville, William A. Burton, New Carrollton, and Allan Sherman, Silver Spring, Md., assignors to the United States of America as represented by the Administrator of the National Aeronautics and Space Administration
Filed Jan. 15, 1969, Ser. No. 791,288
Int. Cl. F03h 5/00; B05b 5/02
U.S. Cl. 60—202                                       9 Claims

ABSTRACT OF THE DISCLOSURE

This disclosure relates to the field of microthrustors utilizing the technique of flowing a slightly conductive propellant through an annular slit and the application of a high voltage causing a force on the fluid, resulting in the ejection of multimolecular particles at the meniscus of the fluid. Various configurations used include concentric bodies, windings of wire around a slit surface and groups of thrustor arrays producing beams of opposite polarities thereby eliminating the requirement for a neutralizer.

---

The invention described herein was made by employees of the United States Government and may be manufactured and used by or for the Government of the United States of America for governmental purposes without the payment of any royalties thereon or therefor.

This invention relates to a system for generating thrusts for propelling space vehicles, and more particularly to a colloid particle generator for use as a satellite microthrustor.

Heretofore, attempts at solving the problems of generating precise and small increments of thrust for specific time durations throughout the life of a satellite have been made using either ion thrustors or resist-o-jets. Although the resist-o-jet has a small power consumption, a large amount of propellant must be carried, increasing system weight. The ion thrustor has a high specific impulse, but requires high power, making it unattractive in situations where electrical power utilization is important to fulfill the mission of a satellite. Hence, these problems have led to the design and experimental investigation of colloid thrustors.

The use of electrostatic acceleration of charged particles of colloid size was suggested as a possible technique for space propulsion as early as 1952 by H. Preston-Thomas in "Interorbital Transport Techniques" J. Brit. Interplanetary Soc. 11, 173 (July, 1952). Experimental studies have been well documented in the literature, typical of which are articles by Hendricks, "Physics of Charges Colloidal Particles and the Technology of Their Production," AGARD-Physics and Technology of Ion Motors, 139 (1966), Hunter, "Quest for Heavy Particle Propulsion"; Third Sym. on Advanced Propulsion Techniques, Oct. 2–4, 1962, Cinn. Ohio, and Aviation Week and Space Technology, Oct. 14, 1968, pp. 85, 87–88.

The characteristic feature of this concept is the use of a charged particle source which employs the phenomenon of electrostatic spraying of liquids. The propellant, typically a low vapor pressure, moderately conductive liquid such as sodium iodide and glycerol, is sprayed from the tips of metallic capillary tubes which are maintained at a high electrical potential. The capillary potential imposes large stresses in the liquid meniscus which forms at the tip of the capillary, causing the meniscus to rupture and eject extremely small, charged particles. Since this ejection occurs in all directions about the tip, the propellant can be considered to be sprayed. Since spraying occurs, colloid thrustors differ from ion engines in that these charged parties are multimolecular rather than atomic.

Conventionally, electrostatic thrustor operation consists of three separate processes: charged particle generation, acceleration and exhaust beam neutralization. Typical prior art devices following this concept are shown in U.S. Pats. 3,120,736 and 3,122,882. However, the state-of-the-art in colloid particle generation by electrostatic spraying has advanced to the point where particle formation and acceleration can be accomplished simultaneously. This advancement has eliminated the requirement for a sophisticated accelerating electrode structure and with it, the problem of accelerating electrode erosion, which has been one of the more serious developmental problems of electrostatic thrustors.

A major problem with prior art needle thrustors is low power output, normally in the range of 2–5 micropounds each. In order to generate larger thrusts, it is necessary to cluster many individual needle thrustors together. This, however, creates a major manufacturing and assembly problem. In addition, due to the large incidence of needle tip erosion, it is frequently necessary to replace damaged needles. If individual replacement is not feasible, the entire assembly may have to be discarded.

Thrustors having rectangular slits have been tested, but due to their basic rectangular shaped orifice, they produce unsymmetrical electrical field lines thus affecting the spray pattern. This results in irregular firing of the thrustor.

These problems have been solved as herein described through the use of an annular slit thrustor using a single flow area to form a torroid shaped meniscus about the firing surface. In this manner, the firing surfaces for spraying are continuous without any discontinuities normally associated with rectangular slits.

The propellant is supplied to the first surfaces from a pressurized source and therefore accurate control can be maintained since capillary action is not present.

In a modification of this invention, small diameter wire is wound around an annular firing surface to provide a multitude of firing points.

It is therefore the principal object of this invention to provide a novel propulsion system for a space flight having higher thrust capabilities, yet of simple design.

Another object of the present invention is to provide a novel microthrustor having reduced power requirements and more uniform firing capabilities.

Still another object of the present invention is to provide a microthrustor device of high reliability and long life, yet easily manufactured.

Other objects of the invention will be apparent from the specification which follows and from the drawings in which like numerals are used throughout to identify like components.

FIG. 1 is a schematic diagram of the system together with a cross-sectional view of one embodiment of a thrustor unit constructed according to this invention;

FIG. 2 is an end view of the thrustor unit of FIG. 1;

Figure 3:
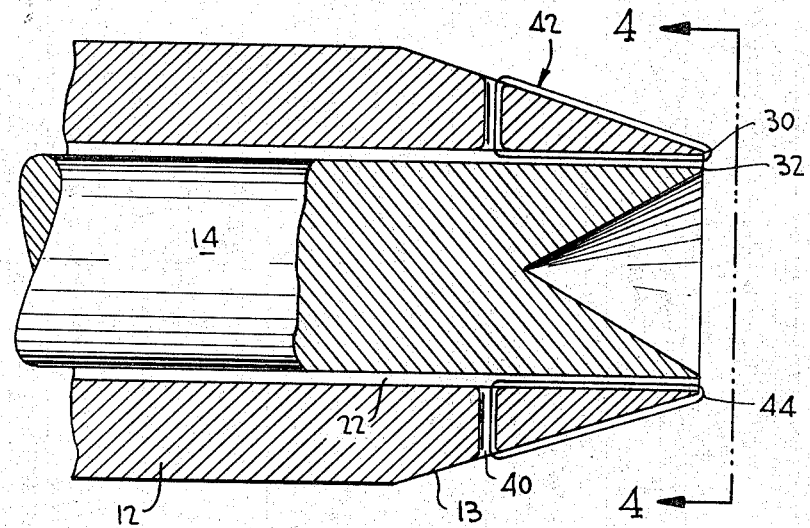
FIG. 3 is a second embodiment of the thruster showing a cross-sectional view of a thrustor tip including windings of wire around a firing surface.
Figure 4:
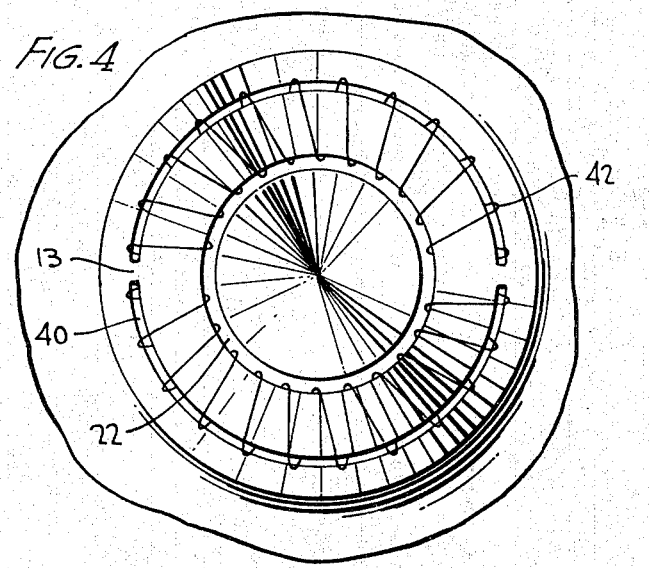
FIG. 4 is an end view of the thrustor tip of FIG. 3.

Referring now to FIGS. 1 and 2 there is shown a preferred embodiment of a colloidal thrustor 10 of the type used as a microthrustor in a spacecraft. This system comprises basically a thrustor outer body 12, an annular inner body 14, an electrical power source 16 and a source of propellant 18. The inner body 14 coaxially fits within an annular space 15 of body 12 and is evenly spaced therein by a series of spacers 20. The spacers separate the inner body from the outer body to form an annular groove 22 having an internal dimension in the order of 0.002 inch. This dimension may be varied to regulate flow rates in the groove in accordance with Poiseuille's equation. The inner body 14 is held in place through the action of locking nut 24 which fixes the position of adjusting nut 26 relative to the wall 28 of the thrustor outer body 12. The front end of the inner body is maintained either flush with or a few thousandths of an inch inside the edge 30 of the thrustor body 12. The position of the inner body with respect to the outer body is adjustable by use of nuts 24 and 26.

A propellant fuel line 19 connects a source of propellant 18 to the thrustor 10. The propellant is a slightly conductive propellant such as sodium iodide and glycerol. This mixture is preferred because it provides a high specific impulse and charge to mass ratios, maintains stable collector and thrustor currents and has a uniform thrust-to-flow rate. However, any slightly conductive liquid having a low vapor pressure could be used as a propellant. For example, salt water could be used. More common propellants include sodium hydroxide and glycerol, sulfuric acid and glycerol and cesium iodide and glycerol. The choice of propellant, however, is a trade-off of values since problems of arcing and deposits are common with these fluids. The fuel line 19 is engaged by gasket 21 and the entire assembly locked into position by cap screw 23. A power supply 16, producing a voltage in the range of 20–25 kv. is electrically connected to screw 23, thereby applying the operating voltage to the annular slit tips 30 and 32.

The tapered end 13 of thrustor outer body 12 is polished to a very sharp edge 30 of approximately .0001 to .0003 inch in thickness. The edge 32 of inner body 14 is likewise sharpened. To prevent erosion, these edges can be coated with platinum and then polished. Alternately, sharpened edges may be sputter coated with platinum in a manner similar to that used for sharpening razor blades. An extractor plate 34, suitably biased by electrical source 36 is positioned at the end 13 of thrustor body 12.

The extractor plate, typically a ring does not contact the thrustor outer body 12 but is maintained at a negative potential with respect to the thrustor and is located in a position vis-a-vis the edges 30–32 to concentrate the electric field intensity and the firing tips to optimize performance. Suitable bias voltages range from —473 v. to —2400 v. The magnitude of the bias voltage is usually in proportion to the power source 16 voltage, typically a ratio of about 10:1. Also, this plate may be segmented to effect an electrostatic deflection of sprayed particles by application of positive and negative deflection voltages to the segments which are electrically insulated from each other.

In operation, upon application of a low feed pressure normally 3 p.s.i., the propellant flows from source 18 through line 19 and opening 25 into the annular groove 22. Because the groove 22 has a small internal dimension, a uniform flow of propellant under pressure is maintained to the firing edges 30–32 of the thrustor. The propellant when reaching the sharpened edges 30 and 32 forms a meniscus in the shape of a torroid in the annular groove 22 about the edges 30 and 32. The high field strength produced by power source 16 and the sharp edges 30 and 32 act on the meniscus to breakdown the propellant surface tension on these edges. This action causes the ejection of multimolecular particles from the surface of the edges 30–32 resulting in a thrust acting on the thrustor. Since there are no electric field discontinuities on the thrustor edges, higher thrust values can be obtained than previously attained by prior art systems. Typical values obtained are in the range of 100 micropounds for a single thrustor as contrasted with values of 40–50 micropounds for prior art multiple needle arrangements.

Although the inner body is conventionally 20 CB stainless steel or hastelloy-C, it could be made of a nonconductive material to allow firing only from the outer body edge 30, or conversely, from the inner edge by fashioning the outer body from a non-conductor and connecting source 16 to the inner body 14. The non-conductive material may be Plexiglas or Teflon. The selected material must be one having good dimensional stability in view of the accurate tolerances maintained between the elements of the thrustor.

The sprayed particles are subsequently neutralized in a conventional manner (not shown) using a heater, bias plate or application of A-C power voltage. However, in a typical station keeping application these thrustors may be paired. In such a configuration, the application of a positive voltage from source 16 to one thrustor and a negative voltage to the other thrustor would serve to self neutralize the entire system thereby eliminating the need for a separate neutralizer assembly.

A second embodiment of the thrustor 10 is shown in FIGS. 3–4 wherein the tapered end 13 is shown. In this embodiment, two slots 40 are located along the tapered end 13 in a plane perpendicular to axial alignment of the inner body 14 and outer body 12. A strand of very fine platinum wire 42 (.00015 inch diameter) is wound around edge 30 of outer body 12 through the slots 40. Once the wire is in place, the slits 40 are potted to prevent leakage of propellant. This configuration, shown in FIG. 4 forms a series of concentric windings about member 12 disposed in groove 22 to form a series of firing points 44 concentric with edge of the inner body 14. Since the wire is of uniform size, a constant edge is maintained to ensure even spraying of the propellant. In operation, a meniscus is established between the inner edge 32 and each point 44 of the wire windings. The advantage of this system is that no edges need be sharpened. Also, the wire is easily replaced and its use lowers the required power.

Having described the invention, what is claimed is:

1. An electrostatic thrustor comprising:

(a) an outer body having an axial chamber extending through the length of said body, said outer body having an annular surface at one end thereof;

(b) an inner body having an annular surface at one end, said inner body positioned within said chamber thereby forming a concentric cylindrical slit between the annular surfaces of said inner and outer bodies, said concentric cylindrical slit extending substantially the length of said chamber;

(c) a propellant line coupled to the other end of said outer body for supplying propellant under low pressures in the order of 3 p.s.i. to said annular surfaces through said slit;

(d) first means for positioning said inner body in axial alignment with said outer body and second means for positioning said inner body at a predetermined distance from said outer body within said chamber; and (e) means for developing an electrostatic spraying of propellant from at least one of said annular surfaces.

2. The thrustor of claim 1 wherein the propellant is sodium iodide and glycerol and said electrostatic spraying results in the spray being of multimolecular particle size.

3. The thrustor of claim 1 wherein both said outer body and said inner body are electrically conductive and said spraying occurs from both outer body and inner body annular surfaces.

4. The thrustor of claim 1 wherein said outer body is electrically conductive and said inner body is electrically non-conductive such that spraying occurs only from said outer body annular surface.

5. The thrustor of claim 1 wherein said outer body is electrically nonconductive and said inner body is electrically conductive such that spraying occurs only from said inner body annular surface.

6. The thrustor of claim 5 wherein said means for developing an electrostatic-spraying of propellant includes a source of electrical potential connected to said outer body, and said annular surfaces are sharp edges.

7. The thrustor of claim 8 including an extractor plate located adjacent to said outer body at said one end of said outer body and means for biasing said extractor plate.

8. The thrustor of claim 7 wherein a conductive wire of small diameter is coiled about the annular surface of said outer body to provide a plurality spraying surfaces about said outer body.

9. An electrostatic thrustor comprising:
   (a) an outer body having an axial chamber extending through the length of said body, said outer body having an annular surface at one end thereof;
   (b) an inner body having an annular surface at one end, said inner body positioned within said chamber thereby forming a concentric slit between the annular surfaces of said inner and outer bodies;
   (c) a propellant line coupled to the other end of said outer body for supplying propellant to said annular surfaces through said slit;
   (d) means for developing an electrostatic spraying of propellant from at least one of said annular surfaces; and
   (e) a conductive wire positioned adjacent to the annular surface of said outer body to provide a plurality of spraying surfaces.

References Cited

UNITED STATES PATENTS

| | | | |
|---|---|---|---|
| 2,893,893 | 7/1959 | Crouse | 239—15X |
| 2,893,894 | 7/1959 | Ransburg | 239—15X |
| 3,049,301 | 8/1962 | Heuschkel | 239—15 |
| 3,120,736 | 2/1964 | Gignoux | 60—202 |
| 3,122,882 | 3/1964 | Schultz et al. | 60—202 |
| 3,286,467 | 11/1966 | Hunter | 60—202 |
| 3,317,138 | 5/1967 | Fraser | 239—15 |
| 3,400,241 | 9/1968 | Gloersen et al. | 60—203X |

DOUGLAS HART, Primary Examiner

U.S. Cl. X.R.

239—15; 317—3